United States Patent [19]

Slobodyanik

[11] 4,151,232
[45] Apr. 24, 1979

[54] COLUMN FOR HEAT- AND MASS EXCHANGE BETWEEN GAS OR STEAM AND LIQUID

[76] Inventor: Ivan P. Slobodyanik, ulitsa Gagarina, 87, kv. 15, Krasnodar, U.S.S.R.

[21] Appl. No.: 805,463

[22] Filed: Jun. 10, 1977

[30] Foreign Application Priority Data

Dec. 10, 1976 [SU] U.S.S.R. .................................. 2428176

[51] Int. Cl.² ............................................... B01F 3/04
[52] U.S. Cl. .................................. 261/114 R; 202/158
[58] Field of Search ................... 261/110, 113, 114 R, 261/114 A, 114 JP, 114 VT, 114 TC, 97, DIG. 44; 202/158

[56] References Cited

U.S. PATENT DOCUMENTS

| | | | |
|---|---|---|---|
| 1,651,354 | 12/1927 | Alexander | 261/114 A |
| 1,708,685 | 4/1929 | Taylor | 261/114 R X |
| 2,600,710 | 6/1952 | Wade | 61/114 A |
| 2,716,024 | 8/1955 | Dice | 261/114 R X |
| 2,752,229 | 6/1956 | Brown et al. | 261/114 R X |
| 3,045,989 | 7/1962 | Kittel | 261/114 R |
| 3,273,872 | 9/1966 | Eckert | 261/110 X |
| 3,357,688 | 12/1967 | Whitlow | 261/114 R |
| 3,759,498 | 9/1973 | Matsch | 261/114 JP |

FOREIGN PATENT DOCUMENTS 344041 3/1960 Switzerland .......................... 261/114 R
682721 11/1952 United Kingdom ............... 261/114 JP

*Primary Examiner*—Richard L. Chiesa
*Attorney, Agent, or Firm*—Steinberg & Blake

[57] ABSTRACT

A column for heat- and mass exchange between gas or steam and liquid comprises contact plates mounted in a casing in a superposed relation to one another, the plates being divided into sections which comprise individual portions of the contact plate raised above the remaining surface thereof. Apertures are made in the sections for the passage of gas and are provided with arched apron plates extending within each section tangentially to the center thereof and in the same direction in such a manner that rotary motion of two-phase gas and liquid flows in the adjacent sections occurs in opposite directions. The sections are arranged in plan in such a manner that their centers are located substantially over an intersection space of lower contact plates. For overflow of liquid from upper contact plates to the sections of lower contact plates there are provided overflow pipes having inlet openings located in the intersection spaces of upper contact plates and outlet openings located over solid central portions of the sections of lower contact plates.

19 Claims, 10 Drawing Figures

COLUMN FOR HEAT- AND MASS EXCHANGE BETWEEN GAS OR STEAM AND LIQUID

The invention relates to the equipment for carrying out heat- and mass-exchange processes between gas and liquid and is concerned with vertical rectification, absorption, washing and contact columns in which liquid flows from the top down and is contacted with gas ascending through the column.

The invention may be most advantageously used for conducting rectification, absorption and washing of gases in high specific capacity columns of 10–12 m in diameter and in which an efficient contact should be provided between great quantities of gas or stream and liquid, where the liquid phase contains solid particles or polymerization products.

Known in the art is a column for heat- and mass exchange between gas and liquid comprising contact plates mounted in a casing in a superposed relation to one another, the plates comprising horizontal walls having apertures for the passage of gas, the plates being divided into individual sections by vertical partition walls and the sections being in the form of regular polygons. Inlet openings of overflow pipes are located at the center of each section, and the outlet openings of the overflow pipes are located over the centers of respective lower sections in a spaced relation to the surface thereof. Horizontal baffling discs are provided under the outlet openings of the overflow pipes so that a space is defined between the discs and the pipe ends to ensure distribution of liquid overflowing from the upper sections in the form of an umbrella and to direct the liquid to the periphery of respective lower sections of lower plates. This column is simple in structure, features low metal consumption for its construction and low hydraulic resistance. During operation of the column, liquid flows down from the overflow pipes to the periphery of a respective lower section of a lower plate and flows from the periphery to the center over the surface of the contact floor of this plate section. Gas ascends through the column, and a zone of double contact of phases is formed under the bubbling conditions. One contact zone is provided directly on the contact surface of the section due to the bubbling of gas through the apertures into the liquid. The other contact zone is provided due to overflow of liquid to the lower plate section in the form of an umbrella, the liquid which falls down being contacted with the ascending gas. Therefore, within each section, the liquid flows down from the overflow pipe which is located over the center of the section and flows from the center to the periphery to be contacted with gas, and then flows from the periphery to the center over the contact surface of the section to be contacted with gas in the bubbling layer. Then the liquid enters the overflow respective section of the lower plate, and so on.

The efficiency of mass exchange of the contact stage is improved in the above-described column due to the provision of an additional zone of contact of phases. Longitudinal and traverse sectioning of gas and liquid flows is effected in this column by using simple elements—sections—so that the liquid load on the periphery of overflow system in individual sections may be lowered at high specific loads in the cross-section of the column. At the same time, simple construction of individual sections provides for substantial reduction of metal consumption for the manufacture of contact plates.

Disadvantages of this column reside in comparatively low admissible gas loads which are limited by entrainment of liquid with gas under the bubbling conditions of operation of contact plate sections, non-uniform distribution of gas and liquid flows across individual plate sections which is inherent in bubbling-type contact apparatus and unstable operation under variations of gas loads over a wide range.

Known in the art is a column having superposed horizontal plates (Kittel plates) having apertures for the passage of gas, the apertures having their axes tangential to the column axis in plates of one group so that a liquid flow rotating about the vertical axis of the plate is formed which moves due to centrifugal forces from the center to the periphery of the plate, and the apertures of the other plates are made in such a manner as to provide for the flow of liquid radially from the periphery of the plate to the center thereof, and the liquid on the adjacent plates flows alternately from the center to the periphery and from the periphery to the center, the plates being alternately provided with central overflow pipes and peripheral overflow pockets with liquid seals for overflow of liquid from upper plates to lower plates.

The above column is simple in structure. Gas ascends through the column, passes through the apertures of the plates and imparts to the liquid on the plates a rotary motion about the plate axis or a radial motion from the periphery to the center. Liquid is fed to the column at the top and performs radial and annular movement from the center to the periphery and radial movement from the periphery to the center while being contacted with gas at each plate. Rotary motion of liquid and gas on the plate eliminates the appearance of a gradient of height of the liquid layer and contributes to uniform distribution of liquid and gas over the contact surface of the plate and to improvement of the efficiency of mass exchange of the contact plate (Murphree efficiency); as regards the radial direction of movement of liquid and gas from the periphery to the center of the plate, the appearance of a gradient of height of the liquid layer is also eliminated thus contributing to uniform distribution of liquid and gas flows over the contact surface of the plate and to improvement of the efficiency of mass exchange between phases. At the same time, the plates with rotary motion of liquid have a much greater perimeter of the peripheral annular overflow and permit much greater loads as to both liquid and gas as compared to the plates with the central overflow due to phase separation in the field of centrifugal forces.

In addition, intensification of mass exchange between phases is ensured under the conditions of rotating two-phase flow on the plate due to repeated interaction of intersecting volumes of gas and liquid.

The disadvantage of such a column consists in unstable and rather inefficient operation under large variation of gas and liquid loads and due to wave formation resulting in non-uniform distribution of gas and liquid flows across the plate. This disadvantage becomes more pronounced with an increase in the plate diameter when liquid loads substantially increase at the peripheral overflow and especially at the central overflow. Therefore, such columns of large diameter are practically inoperable due to overload of the overflow because it is known that with an increase in the plate diameter the overflow perimeter thereof increases in proportion to the first power to the diameter while the liquid load increases in proportion of the second power of the diameter.

It is an object of the invention to improve the capacity and efficiency of mass exchange of large-diameter columns for heat- and mass exchange between gas or steam and liquid.

The above object is accomplished in that in a column for heat- and mass exchange between gas or steam and liquid comprising contact plates mounted in a casing in a superposed relation to one another, the plates comprising horizontal walls divided into individual sections having apertures for the passage of gas or steam and overflow pipes for overflow of liquid from the sections of upper plates to the sections of lower plates, according to the invention, the sections of each plate comprise individual portions of the plate raised above the remaining surface of the plate, and the apertures of each section are provided with arched apron plates extending tangentially to the center of the section and in the same direction in such a manner that rotary motion of two-phase gas-liquid flows in the adjacent sections occurs in opposite directions, the sections of upper plates being arranged in plan in such a manner that their centers are located over intersection spaces of lower plates, the inlet openings of the overflow pipes being located within the intersection spaces of the upper plates, and the outlet openings of the pipes being located over the solid central portions of lower sections. Due to the use of regular rotation of two-phase gas and liquid flow with the radial and annular movement of liquid from the center to the periphery in the column according to the invention there is provided 1.5–2.5 times higher velocity of gas without splash losses as compared to the bubbling conditions of the existing sectioned contact plates. In addition, due to the opposite rotation of flows in the adjacent sections separation of phases takes place in the intersection spaces after contacting them, and clarified liquid without scum is fed to the overflow pipes thus enabling an increase in velocity of liquid in the overflow pipes up to 0.5–0.7 m/s as compared to 0.1–0.2 m/s for admissible velocity at 18 overflow pipes of the bubbling-type plates in which scum enters the overflow devices. With regular rotation of two-phase gas and liquid flow from the center to the periphery at high gas velocity intensification of mass exchange between the phases occurs due to repeated collision of intersecting jets of gas and liquid, centrifugal forces ensure the flow of liquid from the center to the periphery into the intersection spaces, and no overload of the overflow system takes place with high liquid load as is the case with the bubbling operation of plates.

Therefore, the column according to the invention having sectioned plates provides for increased gas and liquid loads and improved mass exchange between phases and enables the provision of columns having high specific capacity.

Each section may be circular in plane so as to provide for rigorously regular rotation of two-phase flow in each section and elimination of splash losses during operation with high gas velocity.

Each section may be sectorial in plan. With this shape of the section, the cross-section of the column is most rationally utilized since the contact area of the plate sections is increased thus enabling an increase in the free cross-sectional area of the plate section apertures and an increase in gas loads with reduced linear gas velocity in the apertures, with the other conditions being equal so that overall hydraulic resistance of each contact plate is lowered.

A separating ring having vertical walls is preferably provided over each section in a spaced relation to the upper side thereof and coaxially with the center of the section, the separating ring insulating the gas and liquid flow rotating over the section from the rotating flows of the adjacent sections thus enabling the formation of regularly rotating flow within each section and separation of phases on the inner walls of the separating ring under the action of centrifugal forces at high velocity of gas. Thus, a distinct separation of phases is ensured, and liquid is fed under the action of centrifugal forces, through a space between the separating ring and the section surface, to the intersection space and to the overflow pipes, and gas, which is separated from the liquid, flows helically upwards to the upper plate.

The upper side of each section is preferably provided with vertical baffles diverging from the center of the section, the baffles being curved in Archimedean spiral from and twisted in the direction corresponding to the rotational direction of gas and liquid flow over the section. Thus, an additional turbulization of gas and liquid flow is ensured, liquid is dispersed, and the interphase surface is enlarged and repeatedly renewed thus resulting in intensification of heat- and mass exchange between phases and improvement of efficiency (Murphee efficiency) of the contact stage. In addition, due to the influence of baffles shaped into an Archimedean spiral, wave formation in the rotating gas and liquid flow is prevented thus contributing to uniform distribution of phase flows across the section so as to result in a further improvement of the efficiency of heat and mass exchange between phases. The provision of baffles in Archimedean spiral form provides for a constant front width of radially diverging rotating liquid flow between the adjacent baffles thus contributing to uniform distribution of gas and liquid flows across the contact plate sections and resulting in improved efficiency of heat- and mass exchange between phases. By changing the size of the baffles (parameters of the Archimedean spiral and height of the baffles) a pre-set efficiency of heat- and mass exchange between phases may be obtained depending on the gas and liquid load ratio. Thus, with very low liquid load and with high steam velocity (vacuum rectification) the residence time of liquid in contact with steam is increased due to the use of baffles in the form of Archimedean spiral having pre-set parameters, while the efficiency of mass exchange of the contact section (Murphree efficiency) may be improved by 1.3–1.5 times compared to the construction without baffles. In another instance, with very high liquid loads and low steam velocity (extractive rectification), where the kinetic energy of steam is not enough for whirling the liquid, the use of baffles in Archimedean spiral form with pre-set parameters provides for additional whirling of liquid in the horizontal plane thus contributing to uniform distribution of liquid across the contact area and improvement of efficiency of heat- and mass exchange between steam and liquid. Contrary to the known sectioned bubbling plates, contact equipment featuring regularly rotating flow and provided with baffles in Archimedean spiral form, provides for gas and liquid contact in a horizontal gas and liquid layer over the section of the contact plate so that minor misalignments due to installation of sections during assembly have no influence on the efficiency of mass exchange in the section.

Two rings are preferably provided around the outlet end of each overflow pipe coaxially therewith to form a running liquid seal, the lower edge of the inner ring being located below the lower edge of the overflow pipe and below the lower edge of the outer ring, and the upper edge of the inner ring being located above the lower edge of the overflow pipe and below the upper edge of the outer ring. As a result, the formation of dead zones of liquid seals over the solid portion of each section around the overflow pipe is eliminated, and there is provided an opportunity of operation with mixtures containing a solid phase as well as with thermally unstable or polymerizing mixtures. Thus, the structure of phase flows which is close to the model of ideal displacement is obtained in the sections, and uniform distribution of diverging flow of liquid from the center to the periphery is ensured thus contributing to an increase in the motive force of the heat- and mass-exchange process between phases and to an improvement of the efficiency of mass exchange (Murphree efficiency) of the sections. In addition, after the supply of gas and liquid to the column is interrupted the liquid is completely drained from the running liquid seals and contact surfaces of the sections thus favourably effecting the starting, operating, stoppage and repair conditions of the column.

A horizontal baffling disc is preferably provided at each overflow pipe over the liquid seal thereof, the disc directing the liquid reflected upon hitting the solid central portion of the section downwardly into the annular liquid seal thus preventing it from splashing and being entrained to the upper contact plate.

The sections are preferably secured to the contact plates by means of support strips extending along the periphery of the sections and inclined to the surface of each contact plate so as to form an additional intersection space under the plate thus providing for an increase in both area and volume of the intersection space in which separation of phases occurs and in which the inlet openings of the overflow pipes are located with an increased perimeter for overflow so as to increase the throughput capacity of the section and contact plate for liquid with simultaneous increase in useful contact area of the sections and the plate as a whole.

The inlet openings of the overflow pipes are preferably elliptical in plan. This enables an increase in the overflow perimeter of the overflow pipes and provides for increased throughput capacity of overflow pipes thus enabling an increase in the liquid load of the sections and the contact plate as a whole without reducing useful contact area of the plate sections.

Therefore, the sectioning of the contact plates of columns along with the use of contact devices within the sections featuring regularly rotating gas and liquid flow provided with baffles in the form of Archimedean spiral and with a running liquid seal system enable, as compared to the sectioned bubbling-type plates, an increase in gas and liquid load, improved quality of separation of thermally unstable or polymerizing products due to intensification of heat- and mass exchange, reduction of the residence time of liquid in the column and lowering of hydraulic resistance of the contact devices under comparable conditions which, in combination, enables the provision of mass-exchange columns of high specific capacity having high efficiency of mass exchange of contact stages (Murphree efficiency).

The invention will now be described with reference to specific embodiments thereof illustrated in the accompanying drawings, in which.

Figure 1:
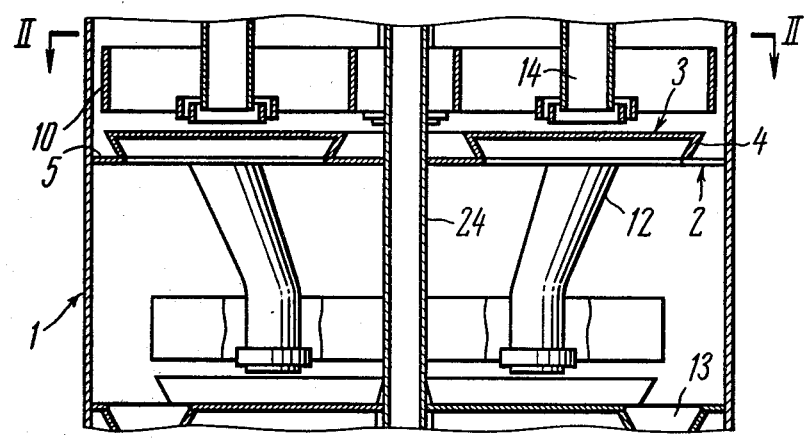
FIG. 1 is a vertical section of a part of the column for heat- and mass exchange between gas or steam and liquid according to the invention with the contact plate sections which are circular in plan.

The column for heat- and mass exchange between gas or steam and liquid comprises a casing 1 (FIGS. 1, 2) which accommodates superposed contact plates 2 made in the form of horizontal walls divided into individual sections 3 which define individual portions of the contact plate 2 raised above the remaining surface of the plate. The sections 3 are circular in plan. The sections 3 are secured to the contact plates 2 by means of support strips 4 (FIG. 1) extending along the periphery of the sections 3 and inclined to the surface of the contact plate 2 to define an additional intersection space under the plate so as to enlarge the area and volume of an intersection space 5 of the contact plate 2 without reducing the area of the sections 3.

Figure 2:
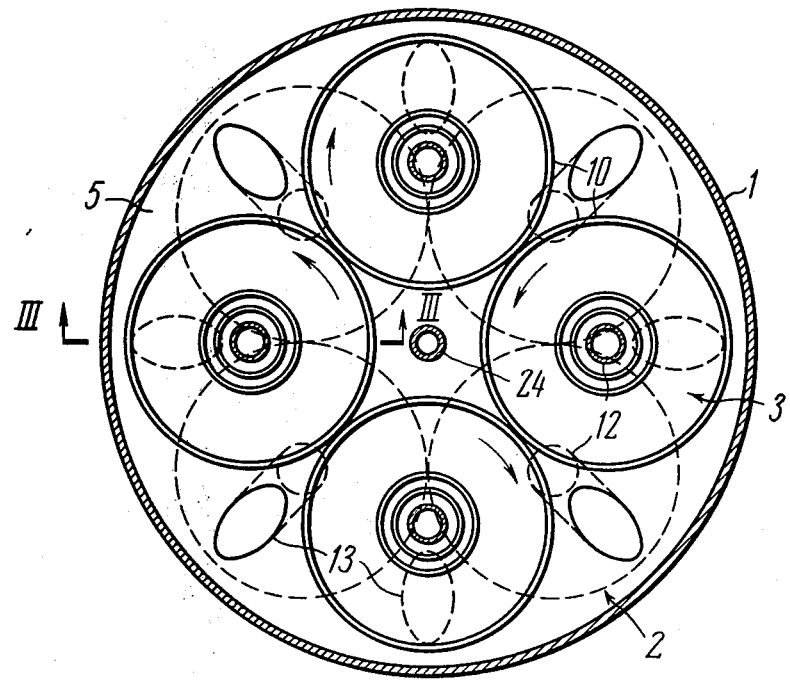
FIG. 2 is a sectional view taken along the line II—II in FIG. 1.
Figure 4:
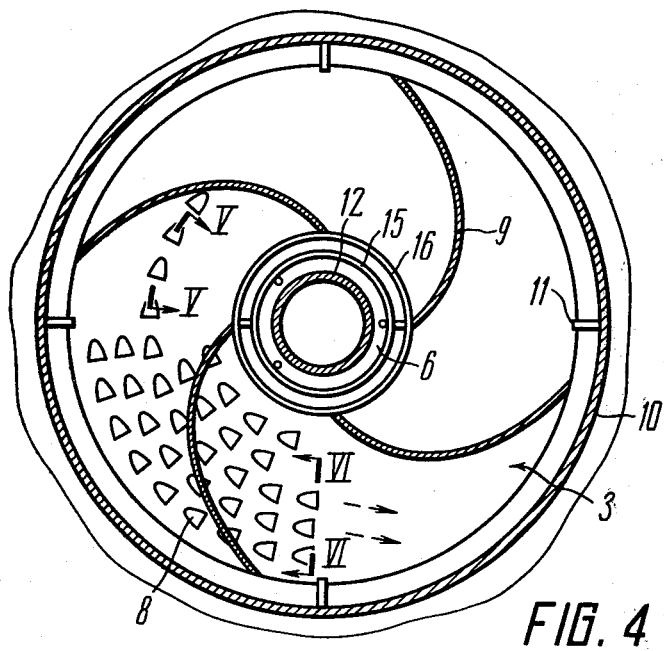
FIG. 4 is a sectional view taken along the line IV—IV in FIG. 3.
Figure 5:
FIG. 5 is an enlarged sectional view taken along the line V—V in FIG. 4.
Figure 6:
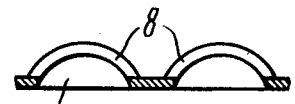
FIG. 6 is an enlarged sectional view taken along the line VI—VI in FIG. 4.

The central portion 6 (FIGS. 3, 4) of each section 3 is made solid, and the remaining part thereof is provided with apertures 7 (FIGS. 5, 6) having arched apron plates 8 for the passage of gas which are arranged along concentric circles around the centers of the sections 3 (FIG. 4) to direct jets of gas passing through the apertures 7 (FIG. 5) tangentially to the centers of the sections 3 (FIG. 3) in the same direction and at a certain angle to the plane of the sections 3 so that rotary motion of gas and liquid flow is ensured within each section 3, the arched apron plates 8 being arranged in the adjacent sections 3 in such a manner that the rotary motion in the adjacent sections 3 occurs in opposite directions as shown by arrows in FIG. 2. In order to achieve this, an even number of the sections 3 are preferably provided on the contact plate 2.

Vertical baffles 9 (FIG. 4) are provided on the liquid receiving side of the sections 3, the baffles being bent in the form of an Archimedean spiral, diverging from the center of the sections 3 and twisted in the direction corresponding to the direction of gas jets under the action of the arched apron plates 8.

A separating ring 10 (FIGS. 3, 4) is provided over each section 3 in a spaced relation to the upper liquid receiving side thereof and coaxially with the section 3, the ring having vertical walls and insulating the gas and liquid flow rotating over the section 3 from the flows rotating in the adjacent sections 3 and separating phases after contacting them. The separating ring 10 is secured to the section 3 by means of arms 11. The separating rings 10 of the adjacent sections 3 adjoin to one another as shown in FIG. 2.

The sections 3 of the vertically adjacent contact plates 3 are shifted relative to one another in plan in such a manner that the centers of the sections 3 of the upper contact plates 2 are located substantially over the intersection spaces of the lower contact plates 2 (the sections 3 of the lower contact plate 2 are shown with dotted lines).

For overflow of liquid from the upper contact plate 2 to the lower plate, there are provided overflow pipes 12 (FIGS. 1, 2). Inlet openings 13 of the overflow pipes 12 are located in the intersection spaces 5 of the upper contact plates 2, and outlet openings 14 (FIG. 1) are located over the solid central portions 6 (FIG. 3) of the respective lower sections 3 in a spaced relation thereto.

The inlet openings 13 (FIG. 2) are elliptical in plan so as to increase the throughput capacity of the overflow pipes 12 for liquid, and the ellipitical shape is obtained by inclining the upper portion of the overflow pipe 12 at the point of connection to the wall of the contact plate 2 or by changing the round section of the overflow pipes 12 to the elliptical section.

Two rings—an inner ring 15 (FIG. 3) and an outer ring 16—are mounted around the outlet end of each overflow pipe 12 coaxially therewith, the rings being mounted in a spaced relation to and over the central solid portion 6 and forming a running liquid seal. A lower edge 17 of the inner ring 15 is located below the lower edge of the overflow pipe 12 and below a lower edge 18 of the outer ring 16 and an upper edge 19 of the inner ring 15 is located above the lower edge of the overflow pipe 12 and below an upper edge 20 of the outer ring 16. The rings 15 and 16 are rigidly interconnected by means of rods 21, and the inner ring 15 is rigidly secured to the solid portion 6 of the section 3 by means of rods 22.

A horizontal baffling disc 23 is preferably mounted at each overflow pipe 12 over the rings 15 and 16 forming the liquid seal, the baffling disc preventing splash losses of liquid. A solid pipe 24 (FIG. 1) is mounted centrally of the column for supporting bearing structures and large-diameter contact plates 2 so as to impart rigidity to the system.

Figure 9:
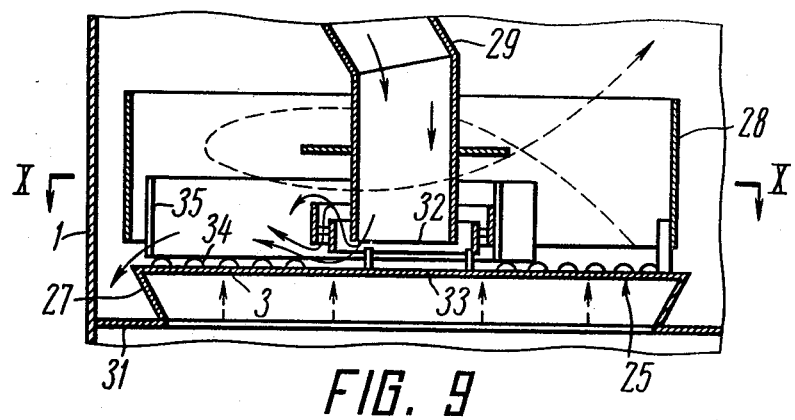
FIG. 9 is an enlarged sectional view taken along the line IX—IX in FIG. 8.
Figure 10:
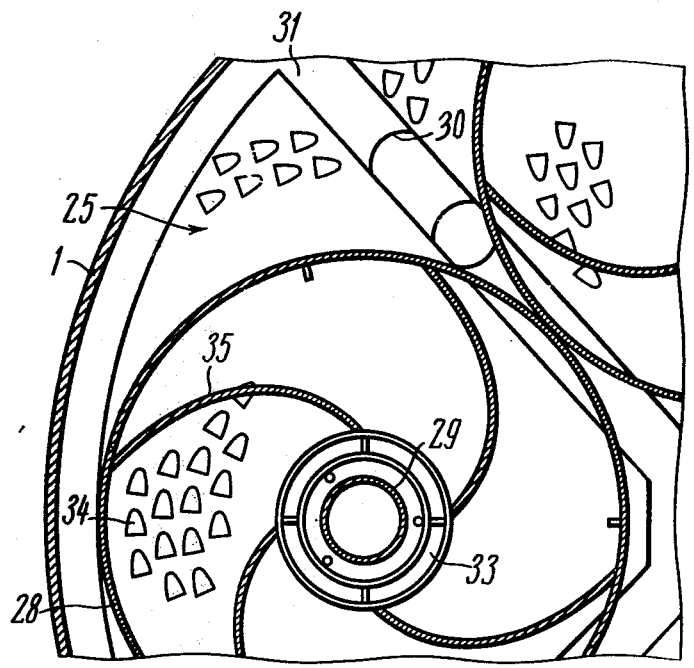
FIG. 10 is a sectional view taken along the line X—X in FIG. 9.

The sections 3 which are circular in plan provide for establishment or rigorously regular rotation of two-phase gas and liquid flow in each section 3 and ensure the elimination of splash losses when operating at high gas velocity. However, in order to provide for more rational utilization of cross-sectional area of the column, the sections may be sectorial in plan, such as sections 25 (FIGS. 7,8) of a contact plate 26. The sections 25 are also secured to the contact plates 26 by means of support strips 27 (FIG. 7) extending along the periphery of the sections 25 and inclined to the surface of the contact plate 26 to form an additional intersection space under the plate. The sections 25 of the vertically adjacent contact plates 26 are staggered in plan in such a manner that the centers of the sections 25 of the upper contact plates 26 are located substantially over the intersection spaces of the lower contact plates 26, and a separating ring 28 is provided over each section 25 (the sections 25 and the separating rings 28 of the lower contact plate 26 are shown with dotted lines in FIG. 8). Overflow of liquid from the upper sections 25 to the lower ones occurs through overflow pipes 29 having their inlet openings 30 located in intersection spaces 31 and the outlet openings 32 (FIG. 7) located over solid central portions 33 (FIG. 9). The remaining part of each section 25 is provided with apertures having arched apron plates 34 (FIGS. 9, 10) similarly to the apertures 7 (FIGS. 5, 6) having the arched apron-plates 8, the apertures and apron plates being arranged along concentric circles around the solid central portion 33 (FIGS. 9, 10) to ensure rotary motion of the gas and liquid flow over the section 25. Baffles 35 similar to the baffles 9 (FIG. 4) are secured to the sections 25. The provision of the sectorial sections 25 enables the enlargement of free cross-sectional area of the apertures for the passage of gas compared to the sections 3 (FIGS. 1, 2) and an increase of gas loads with lower linear velocity of gas in the apertures.

For feeding liquid to the top part of the column, there is provided a distribution device of any appropriate known design (not shown) communicating with the upper overflow pipes 12 (FIG. 1) or 29 (FIG. 7) so that liquid is fed to the center of each section 3 or 25, respectively, of the top contact plate.

The column for heat- and mass exchange between gas or steam and liquid functions in the following manner.

Figure 3:
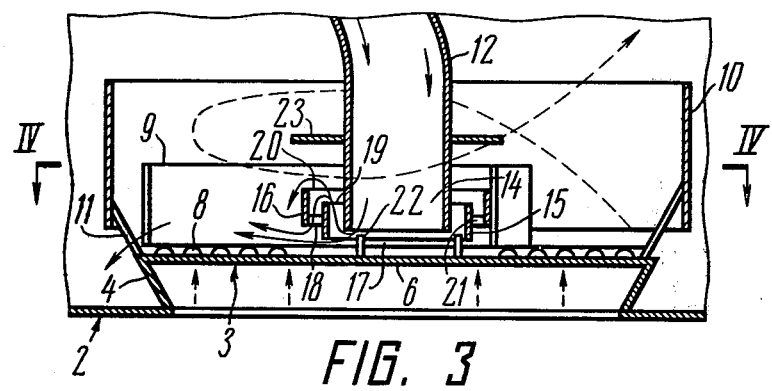
FIG. 3 is an enlarged sectional view taken along the line III—III in FIG. 2.
Figure 7:
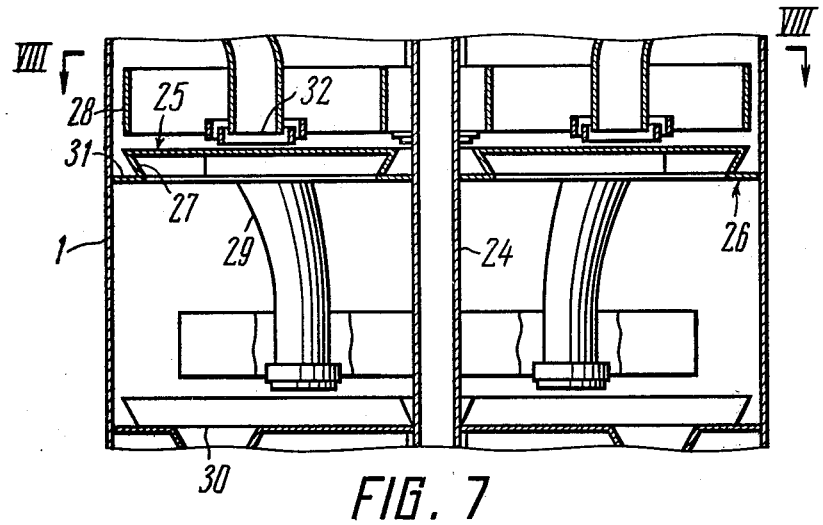
FIG. 7 is a vertical section of a part of the column for heat-and mass exchange between gas or steam and liquid with the contact plate sections according to the invention which are sectorial in plan.
Figure 8:
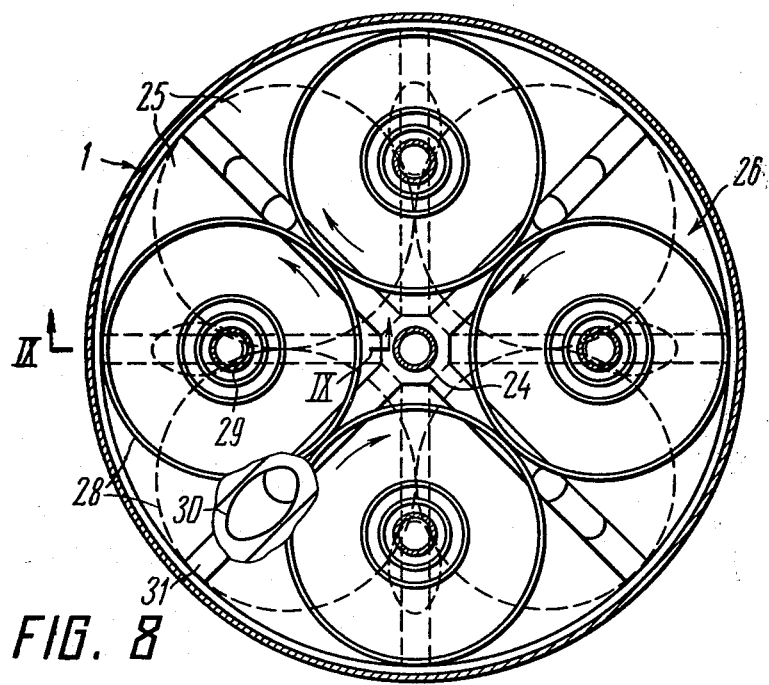
FIG. 8 is a sectional view taken along the line VIII—VIII in FIG. 7.

Gas ascends through the column, enters the space under the contact plates 2 (FIG. 1) or 26 (FIG. 7) and passes through the apertures 7 (FIG. 5) having the arched apron plates 8 so that regularly rotating gas flow is formed over each section 3 (FIG. 1) or 25 (FIG. 7). This flow entrains the liquid fed to the centers of the sections 3 (FIG. 1) or 25 (FIG. 7) and gives up a part of kinetic energy to the liquid so that a regularly rotating two-phase gas and liquid flow is formed on the contact surface of the sections 3 (FIG. 1) or 25 (FIG. 7). The liquid performs a combined radial and annular movement in a horizontal plane away from the center of the section 3 (FIG. 1) or 25 (FIG. 7) to the periphery, and the gas moves helically upwards (the direction of movement of gas flows in the sections is shown in FIGS. 3 and 9 by dotted arrows and the direction of movement of the liquid flows is shown by solid arrows).

The two-phase rotary flow is reflected from the curvilinear baffles 9 (FIG. 4) or 35 (FIG. 10) in the form of an Archimedean spiral so that an additional turbulization of the gas flow occurs, the liquid is dispersed and criss-cross collisions of elementary volumes of gas and liquid, repeated renewal and enlargement of interphase surface take place thus resulting in intensification of mass exchange in phases and in improvement of the efficiency of mass exchange of the contact stage (Murphree efficiency). The separating ring 10 (FIG. 4) or 28 (FIG. 10) contributes to the formation of regularly rotating two-phase gas and liquid flow in the individual section 3 (FIG. 1) or 25 (FIG. 7) and to separation of gas and liquid after contacting them. Thus, the liquid which is reflected from the inner walls of the separating ring 10 (FIG. 4) or 28 (FIG. 10) flows down and gets in the intersection space 5 (FIG. 1) wherefrom it flows down through the overflow pipes 12 to the center of the sections 3 of the lower contact plates or, moving in the same manner, gets in the intersection space 31 (FIG. 7) and flows through the overflow pipes 29 to the center of the sections 25 of the lower contact plate 26.

Gas moves upwards along a helical path to the space under the sections 3 (FIG. 1) or 25 (FIG. 7) of the upper contact plate, and so on. As the direction of curvature of the baffles 9 (FIG. 4) or 35 (FIG. 10) in the form of an Archimedean spiral coincides with the direction of regularly rotating two-phase gas and liquid flow diverging from the center to the periphery, the liquid flows without longitudinal stirring thus contributing to the growth of concentration gradients in the liquid phase and increase in the motive force of the mass-exchange process which results in an improvement of the efficiency of mass exchange of the contact plate (Murphree efficiency).

Constant width of the front of movement of the diverging flow of liquid between the adjacent baffles 9 (FIG. 4) or 35 (FIG. 10) contributes to uniform transverse distribution of the diverging flow of liquid over the contact area of the sections 3 (FIG. 4) or 25 (FIG. 10), hence to uniform distribution of gas flow which is also known to result in an improvement of the efficiency of mass exchange between phases. At the same time, the baffles 9 (FIG. 4) or 35 (FIG. 10) prevent wave formation in the rotary gas flow on the contact surface of the sections 3 (FIG. 4) or 25 (FIG. 10) which also contributes to uniform distribution of phase flows and improves the efficiency of mass exchange of the contact plates, the more so that with an increase of size of the sections 3 (FIG. 4) or 25 (FIG. 10) the wave formation strongly disturbs uniformity of distribution of phase flows across the contact area.

Due to the opposite rotational directions of two-phase flows in the adjacent sections 3 (FIG. 1) or 25 (FIG. 7) at the overflow of liquid into the intersection space 5 (FIG. 1) or 31 (FIG. 7), respectively, the adjacent rotary flows tangentially adjoin to one another, and distinct separation of phases occurs without splash losses.

The construction of the contact system with regularly rotating flow in the sections of the contact plate of the column according to the invention efficiently operates at low specific liquid loads and high steam velocity (vacuum rectification) due to the favourable influence of the baffles 9 (FIG. 4) and 35 (FIG. 10) which contribute, with given hydrodynamic conditions, to the enlargement of volume of the liquid retained on the contact surface and, hence, to an increase in the average residence time of liquid in contact with steam thus contributing to an improvement of the efficiency of heat- and mass exchange between phases. The construction of the column according to the invention is also efficient with high specific liquid loads and low steam velocity (extractive rectification) due to the favourable influence of the baffles 9 (FIG. 4) or 35 (FIG. 10) having certain parameters which contribute, with given hydrodynamic conditions, to the whirling of the flow of liquid diverging from the center to the periphery and to the establishment of regularly rotating two-phase flow over the contact surface because under those conditions the kinetic energy of steam jets flowing from the apertures 7 (FIG. 5) with arched apron plates 8 is insufficient for intensive whirling of liquid. Due to uniform distribution of the regularly rotating two-phase gas and liquid flow over the contact surface high efficiency of heat- and mass exchange is ensured.

Due to enlarged volume of the intersection space 5 (FIG. 1) or 31 (FIG. 7) separation of phases after contacting them is ensured and throughput capacity of the overflow pipes 12 (FIG. 1) or 29 (FIG. 7) for liquid is improved because deaerated liquid without gas enters the overflow pipes 12 (FIG. 1) and 29 (FIG. 7) through the elliptical inlet openings so that the admissible velocity in the overflow pipes 12 (FIG. 1) and 29 (FIG. 7) is increased to 0.5–0.7 m/s.

With the overflow of liquid through the running liquid seal the liquid fills up the space of the inner ring 15 (FIG. 3) and partially passes through the space between the lower edge 17 of the inner ring 15 and the solid central portion 6 of the section 3, while the remaining part of the liquid flows over the upper edge 19 of the inner ring into the space between the rings 15 and 16 and flows further to the contact surface of the section 3. In addition, a part of the liquid may flow over the upper edge 20 of the outer ring 16 to the contact surface of the sections 3. Therefore, during operation, with the overflow of liquid from the overflow pipe 12, with a pre-set ratio of sizes of the rings 15 and 16, the inner ring 15 is filled up with liquid, and the overflow pipe 12 is submerged in liquid thus forming a running liquid seal. Thus, solid particles and polymerization products may freely pass through the spaces between the rings 15 and 16 and the central part 6. In addition, liquid gets to the contact surface of the sections 3 and section 25 (FIG. 7) with a certain initial velocity thus preventing the appearance of gradient of height of the liquid layer on the contact surface and contributing to uniform distribution of liquid, the residence time of liquid in the liquid seal being reduced. However, upon interruption of liquid supply to the overflow pipes 12 (FIG. 1), the liquid is completely drained from the solid portion 6 of the section 3, and upon interruption of gas supply, liquid is completely drained from the contact surface of the sections 3 and from the running liquid seal together with solid particles or polymerization products.

The use of sectioned contact plates with regularly rotating flow over each individual section enables a 1.5–2.5 increase in the gas velocity without splash losses and an improvement of the efficiency of mass exchange (Murphree efficiency) of the contact plates which is advantageous for large-diameter columns.

Due to the fact that with the regularly rotating two-phase flow diverging from the center to the periphery on the contact surface of the sections liquid flows under the action of centrifugal forces and the liquid overflow perimeter is much greater than for the contact plates with diametrical movement of liquid, there is no overload of overflow devices even with the maximum specific liquid loads of the order of above 100 m$^3$/m$^2$ hour, and uniform distribution of liquid and gas over the contact surface is ensured, longitudinal stirring of liquid is considerably reduced and concentration gradients in phases are increased which finally results in an improvement of the mass-exchange efficiency of large-diameter contact plates (Murphree efficiency). All the above-mentioned advantages of the column for heat- and mass exchange between gas and liquid according to the invention contribute to an improvement of productivity and efficiency, better purity and quality of products being separated, hence to reduction of the production cost.

What is claimed is:

1. A column for heat-and mass-exchange between gas or steam and liquid comprising: a casing; contact plates mounted in said casing in superposed relation to one another, each of said contact plates having a plurality of sections respectively in the form of individual portions of each contact plate which are raised above the remaining surface thereof and which are at least partly spaced from each other to define beyond said sections an intersection space at said remaining surface of each plate, the sections being arranged in plan in such a manner that central portions of the sections of an upper contact plate are offset with respect to central portions of the sections of a lower contact plate and are located substantially over the intersection space of a lower contact plate, said sections having solid central portions, and the remaining surface of the sections being provided with apertures for the passage of gas or steam; overflow pipes for overflow of liquid from upper contact plates to the sections of lower contact plates, said overflow pipes having upper inlet openings located at and communicating with the intersection spaces of upper contact plates and lower outlet openings located respectively over said solid central portions of the sections of lower contact plates; arched apron plates forming part of each section and situated over said apertures thereof for directing jets of gas or steam leaving the apertures tangentially to the center of the section and in the same direction at any one section but in opposite directions at adjacent sections, respectively, so that the rotary motion of two-phase gas and liquid flows in the adjacent sections of each contact plate occur in opposite directions.

2. A column according to claim 1, wherein each of said sections is circular in plan.

3. A column according to claim 2, wherein there are provided separating rings having vertical walls, each ring being mounted over each of said sections in a spaced relation to the upper side and coaxially with the center thereof, the separating rings insulating the gas and liquid flow rotating over a section from rotating flows of the adjacent sections.

4. A column according to claim 2, wherein there are provided vertical baffles mounted on the upper side of each of said sections, the baffles diverging from the center of the sections and being curved in the form of an Archimedean spiral twisted in the direction corresponding to the rotational direction of the gas and liquid flow over the section.

5. A column according to claim 2 comprising running liquid seals mounted at the outlet ends of said overflow pipes and including an inner ring of each of said liquid seals mounted around the outlet end of the overflow pipe coaxially therewith and in a spaced relation to said solid central portion of the section to which said overflow pipe is connected; an outer ring of said liquid seals being mounted coaxially with said inner ring, the lower edge of said inner ring being located below the lower edge of said overflow pipe and below the lower edge of said outer ring, and the upper edge of said inner ring being located above the lower edge of said overflow pipe and below the upper edge of said outer ring.

6. A column according to claim 1, wherein each of said sections is sectorial in plan.

7. A column according to claim 6, wherein there are provided separating rings having vertical walls, each ring being mounted over each of said sections in a spaced relation to the upper side and coaxially with the center thereof, the separating rings insulating the gas and liquid flow rotating over a section from rotating flows of the adjacent sections.

8. A column according to claim 6, wherein there are provided vertical baffles mounted on the upper side of each of said sections, the baffles diverging from the center of the sections and being curved in the form of an Archimedean spiral twisted in the direction corresponding to the rotational direction of the gas and liquid flow over the section.

9. A column according to claim 6 comprising running liquid seals mounted at the outlet ends of said overflow pipes and including an inner ring of each of said liquid seals mounted around the outlet end of the overflow pipe coaxially therewith and in a spaced relation to solid central portion of the section an an outer ring of said liquid seals mounted coaxially with said inner ring, the lower edge of said inner ring being located below the lower edge of said overflow pipe and below the lower edge of said outer ring, and the upper edge of said inner ring being located above the lower edge of said overflow pipe and below the upper edge of said outer ring.

10. A column according to claim 1, wherein there are provided separating rings having vertical walls, each ring being mounted over each of said sections in a spaced relation to the upper side and coaxially with the center thereof, the separating rings insulating the gas and liquid flow rotating over a section from rotating flows of the adjacent sections.

11. A column according to claim 1, wherein there are provided vertical baffles mounted on the upper side of each of said sections, the baffles diverging from the center of the sections and being curved in the form of an Archimedean spiral twisted in the direction corresponding to the rotational direction of the gas and liquid flow over the section.

12. A column according to claim 1 comprising running liquid seals mounted at the outlet ends of said overflow pipes and including an inner ring of each of said liquid seals mounted around the outlet end of the overflow pipe coaxially therewith and in a spaced relation to said solid central portion of the section and an outer ring each of said liquid seals mounted coaxially with said inner ring, the lower edge of said inner ring being located below the lower edge of said overflow pipe and below the lower edge of said outer ring, and the upper edge of said inner ring being located above the lower edge of said overflow pipe and below the upper edge of said outer ring.

13. A column according to claim 12, comprising horizontal baffling discs each mounted at each of said overflow pipes over said liquid seal thereof.

14. A column according to claim 5, comprising horizontal baffling discs each mounted at each of said overflow pipes over said liquid seal thereof.

15. A column according to claim 9, comprising horizontal baffling discs each mounted at each of said overflow pipes over said liquid seal thereof.

16. A column according to claim 1, comprising support strips for securing said sections to said contact plates, the support strips extending along the periphery of said sections and being inclined in a direction extending downwardly and beneath said sections to the surface of the contact plate to form an additional intersection space under the sections at said remaining surface of the contact plate.

17. A column according to claim 1, wherein said inlet openings of the overflow pipes are elliptical in plan.

18. A column for heat-and-mass exchange between gas or steam and liquid comprising: a casing; contact plates mounted in said casing in superposed relationship to one another so that each plate forms a lower plate with respect to the next higher plate and an upper plate with respect to the next lower plate, each of said contact plates having a plurality of sections in the form of individual portions of each contact plate which are at least partly spaced from each other to define between said sections at the surface of each plate which is situated between said sections an intersection space situated beyond said sections, each section having a solid central portion while the remainder thereof is formed with apertures the configuration of which provides for passage of gas or steam from the lower to the upper surface of each section in a direction which is tangential to the center of each section to provide for rotary motion of a two-phase gas and liquid flow at each section around the center thereof, and overflow pipes having upper inlet openings located at and communicating with the intersection space of an upper contact plate and lower outlet openings located over said solid central portions of the sections of lower contact plates, so that liquid travelling beyond said sections to said intersection space flows through said overflow pipes down to the solid central portions of the sections of a lower plate, said sections being circumferentially distributed about a central region of each contact plate with said intersection space having portions situated between the periphery of each contact plate and the sections thereof, said sections being angularly offset from one plate to the next to an extent situating the sections of a lower plate beneath the portions of the intersection space of an upper plate, and each overflow pipe extending from a portion of an intersection space of an upper plate directly down to the solid central portion of the section situated beneath said latter portion of the intersection space of an upper plate with each overflow pipe being substantially straight and extending substantially vertically so that said overflow pipes interfere to a minimum with the upward flow of gas or steam from each lower plate toward the upper plate.

19. A column according to claim 18 and wherein there are separating rings having vertical walls, each ring being mounted over each of said sections in spaced relation to the upper side and coaxially with the center thereof, said separating rings insulating the gas and liquid flow rotating over a section from rotating flows of adjacent sections, and the rings which are situated over the sections of each contact plate contacting each other.

* * * * *